July 4, 1933. H. O. STEPHENS ET AL 1,917,163
TEMPERATURE INDICATOR
Filed April 30, 1931
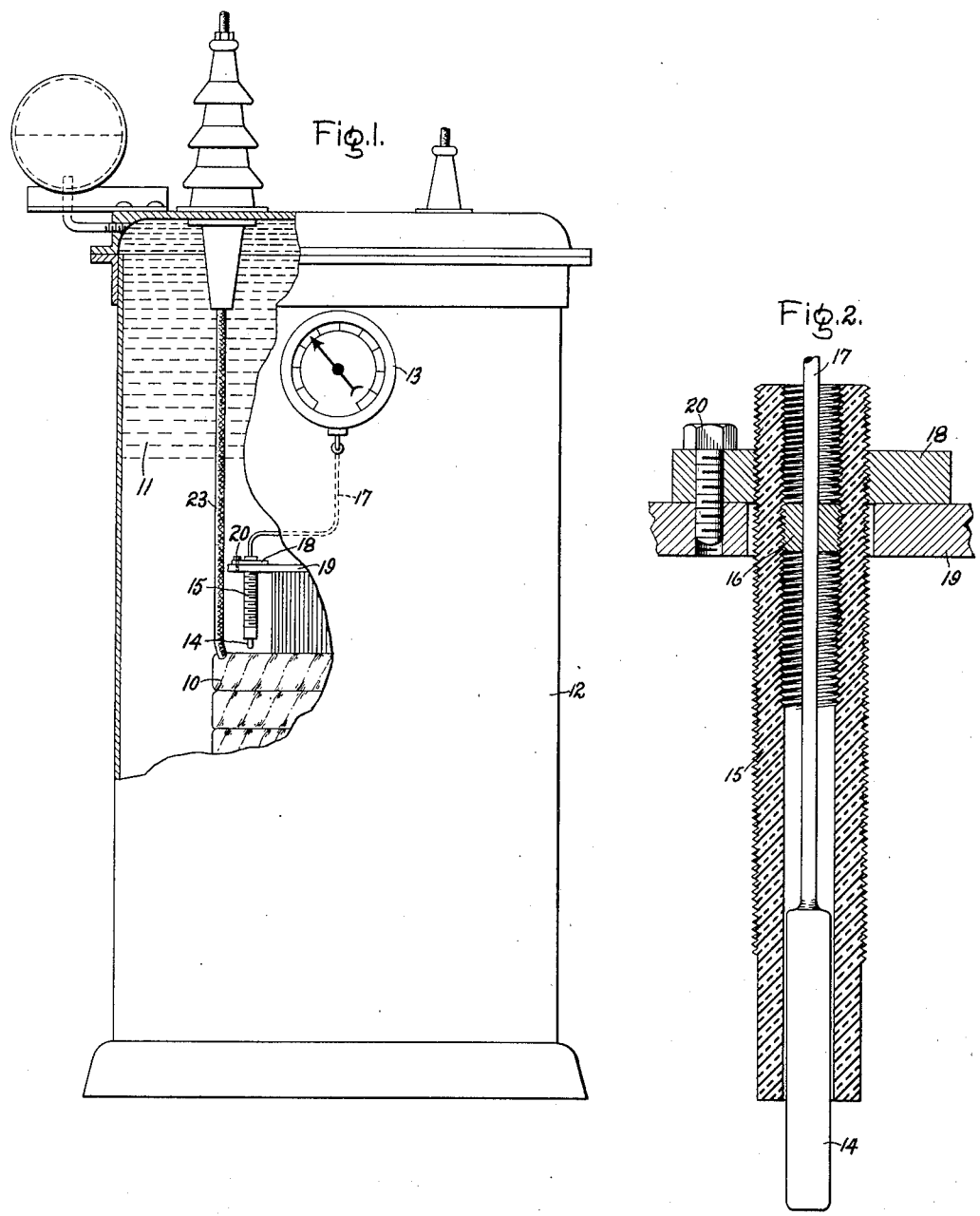
Inventors:
Howard O. Stephens,
Friend H. Kierstead,
by Charles E. Tullar
Their Attorney Patented July 4, 1933

1,917,163

UNITED STATES PATENT OFFICE

HOWARD O. STEPHENS AND FRIEND H. KIERSTEAD, OF PITTSFIELD, MASSACHUSETTS, ASSIGNORS TO GENERAL ELECTRIC COMPANY, A CORPORATION OF NEW YORK

TEMPERATURE INDICATOR

Application filed April 30, 1931. Serial No. 534,026.

Our invention relates to temperature indicators, and more particularly to devices for indicating internal temperatures of electrical induction apparatus such as transformers and reactors. The maximum load capacity of such apparatus is limited by the maximum allowable temperature of its windings, insulation and other internal parts. Some means for indicating the temperature of these parts, particularly when this temperature is at or near its maximum allowable value, is therefore often highly desirable.

Electrical induction apparatus, when in operation, usually produces a leakage flux field which is approximately directly proportional at any point to the current or load in the windings of the apparatus. If any conductive material is placed in the path of this leakage flux, the flux will produce eddy currents in the conductive material and the energy of these eddy currents will appear as heat which will raise the temperature of the material. If the material is magnetic, the flux will also produce hysteresis losses which will also appear as heat and further raise the temperature of the material. The general object of the invention is to produce an improved temperature indicator which shall be responsive to heat produced by the leakage magnetic field produced by electrical induction apparatus and which shall indicate temperature conditions of the apparatus. The invention is thus particularly adapted for use in connection with apparatus which produces high leakage flux such as reactors and high reactance transformers.

The invention will be better understood from the following description taken in connection with the accompanying drawing in which Fig. 1 shows a temperature indicator constructed and arranged in accordance with the invention as applied to a transformer, and Fig. 2 is an enlarged sectional detail view of part of the indicator.

Like reference characters indicate similar parts in both figures of the drawing.

The invention will be explained as applied in connection with the transformer 10 shown in Fig. 1. This transformer is cooled by a body of cooling and insulating oil 11 in which the transformer is immersed, the transformer and oil being enclosed in a casing 12. A temperature indicating instrument 13 has a temperature responsive element 14 which is located near the transformer and in a position within the path of the leakage flux when the transformer is in operation. The temperature indicator 13 is shown as being the usual type of bulb thermometer although it will be apparent that other types of indicators may be used if desired. The temperature responsive element 14 is formed of some suitable conductive material such as copper or steel in which eddy currents will be induced by the leakage flux of the transformer. If a magnetic material such as steel is used, the leakage flux will also cause hysteresis losses. These eddy current and hysteresis losses will appear as heat which will tend to raise the temperature of the element 14 above that of the surrounding cooling medium.

When the transformer is not loaded, the temperature of the element 14 will be that of the cooling medium 11. When the transformer is loaded, the internal temperature of the transformer is higher than that of the cooling medium 11. If the indicator 13 is to indicate the internal temperature of the transformer, then the losses due to the leakage flux in the element 14 must increase the temperature of this element to the same extent that the load on the transformer increases the internal temperature of the transformer. These temperature conditions are affected by various electrical and magnetic losses which appear as heat. The temperature of the element 14 will depend not only on the rate at which heat is produced in it by the leakage flux but also on the rate at which the heat is dissipated into the surrounding cooling medium. The rate at which this heat is produced will depend upon the location of the element 14 in the leakage flux field because the intensity of the field is different at different points. The temperature responsive element 14 is held in an internally threaded heat insulating tube 15 by a threaded nipple 16 screwed into the tube and soldered or otherwise secured to the capillary tube 17 leading from the element 14. The heat insulating tube 15 is threaded into a nut 18 which is locked in position on a support 19 by a locking screw 20. With the locking screw 20 removed, the nut 18 may be turned on the tube 15 to raise or lower the temperature responsive element 14 until it is at a point in the leakage flux field of such density as to heat the element 14 at the desired rate. By turning the tube 15 with the nut 18 on the nipple 16, the temperature responsive element 14 may be raised or lowered in the tube 15 to expose more or less of the element 14 to the surrounding cooling medium below the lower end of the tube 15, thus varying the rate at which the heat is dissipated from the element 14 to the cooling medium.

By means of the adjustments which have been described, it is easy to arrange the indicator 13 to show the internal temperature of the transformer correctly at one point at least and either correctly or with reasonable approximation at all other points. It is usually satisfactory if the maximum temperature which is considered safe for the transformer be indicated accurately and other temperature conditions of the transformer be indicated either accurately or reasonably so.

The invention provides a very simple effective and practically accurate arrangement for indicating the temperature conditions of electrical induction apparatus. There is a further decided advantage that all parts of the indicator may be easily and effectively insulated from all high voltage parts of the apparatus with which it is associated because the indicator parts may be well separated and spaced from the apparatus without impairing its accuracy.

The invention has been explained by describing and illustrating a particular form and application thereof, but it will be apparent that changes may be made without departing from the spirit of the invention or the scope of the appended claim.

What we claim as new and desire to secure by Letters Patent of the United States, is:

The combination with electrical induction apparatus, of a temperature indicator, said indicator including a metallic temperature responsive element located in the path of leakage flux from said apparatus, and means for adjusting the rate of dissipation of heat from said element.

In witness whereof, we have hereunto set our hands.

HOWARD O. STEPHENS.
FRIEND H. KIERSTEAD.